(12) United States Patent
Kennedy et al.

(10) Patent No.: US 12,460,076 B2
(45) Date of Patent: Nov. 4, 2025

(54) CURABLE COMPOSITIONS

(71) Applicant: Henkel AG & Co. KGaA, Duesseldorf (DE)

(72) Inventors: Lisa Kennedy, Kilberry Navon County Meath (IE); Orkideh Hajatpour, Naas (IE); Darragh Fitzpatrick, Newbridge (IE)

(73) Assignee: Henkel AG & Co. KGaA, Duesseldorf (DE)

( * ) Notice: Subject to any disclaimer, the term of this patent is extended or adjusted under 35 U.S.C. 154(b) by 304 days.

(21) Appl. No.: 17/542,612

(22) Filed: Dec. 6, 2021

(65) Prior Publication Data

US 2022/0089856 A1    Mar. 24, 2022

Related U.S. Application Data

(63) Continuation of application No. PCT/EP2020/068173, filed on Jun. 26, 2020.

(60) Provisional application No. 62/866,684, filed on Jun. 26, 2019.

(51) Int. Cl.
| | | |
|---|---|---|
| *C08L 33/14* | (2006.01) | |
| *B29C 64/129* | (2017.01) | |
| *B29K 9/00* | (2006.01) | |
| *B29K 33/00* | (2006.01) | |
| *B29K 75/00* | (2006.01) | |
| *B33Y 10/00* | (2015.01) | |
| *B33Y 40/20* | (2020.01) | |
| *B33Y 70/00* | (2020.01) | |

(52) U.S. Cl.
CPC ............ *C08L 33/14* (2013.01); *B29C 64/129* (2017.08); *B33Y 10/00* (2014.12); *B33Y 40/20* (2020.01); *B33Y 70/00* (2014.12); *B29K 2009/00* (2013.01); *B29K 2033/08* (2013.01); *B29K 2075/00* (2013.01); *B29K 2995/0077* (2013.01); *B29K 2995/0081* (2013.01); *B29K 2995/0082* (2013.01)

(58) Field of Classification Search
CPC ....... C08L 33/14; B29C 64/129; B33Y 10/00; B33Y 40/20; B33Y 70/00; B29K 2009/00; B29K 2033/08; B29K 2995/0082; B29K 2075/00; B29K 2995/0081; C08F 279/02; C08F 285/00; C08F 290/048; C08F 283/008; C08F 2/50; C09D 175/14
See application file for complete search history.

(56) References Cited

U.S. PATENT DOCUMENTS

| | | | |
|---|---|---|---|
| 11,028,204 B2 | 6/2021 | Jain et al. | |
| 2021/0122947 A1* | 4/2021 | Tabata | B32B 17/10 |

FOREIGN PATENT DOCUMENTS

| | | |
|---|---|---|
| CH | 711131 A2 | 11/2016 |
| CN | 107849369 A | 3/2018 |
| WO | 2016153711 | 9/2016 |
| WO | 2018219729 | 12/2018 |
| WO | 2019071564 A1 | 4/2019 |
| WO | 2019103855 | 5/2019 |

OTHER PUBLICATIONS

"CN9014 NS" Kaiyin Shanghai Kaiyin Chemical Co., Ltd (No Date).*
PCT International Search Report issued in connection with International Patent Application No. PCT/EP2020/068173 mailed on Oct. 9, 2020.

* cited by examiner

Primary Examiner — Jessica M Roswell
(74) Attorney, Agent, or Firm — Steven C. Bauman

(57) ABSTRACT

Provided herein are curable compositions useful for, among other things, making three-dimensional parts by additive manufacturing. The compositions when cured exhibit a surprising balance of improved tensile strength and percent elongation.

18 Claims, No Drawings

CURABLE COMPOSITIONS

BACKGROUND

Field

Provided herein are curable compositions useful for, among other things, making three-dimensional parts by additive manufacturing. The compositions when cured exhibit a surprising balance of elastomeric rebound, tensile strength and percent elongation at break.

BRIEF DESCRIPTION OF RELATED TECHNOLOGY

Additive manufacturing is fast becoming a viable alternative to traditional manufacturing techniques and in some cases the only practical alternative for making complex parts. However, despite the efforts of many in the field, it has proven challenging to provide a photocurable resin that confers elastomeric toughness and flexibility to a three-dimensional printed part.

Accordingly, it would be desirable to provide a radiation curable composition displaying a well-balanced set of properties that permits a three-dimensional printed part to withstand the rigors of ordinary end use without damage during the life of the part.

SUMMARY

These desires are satisfied by the present invention.

Whereas in the past, a three-dimensional printed part may be printed successfully, the physical property set obtained by the part may be lacking with respect to the end use to which the part was intended to be placed.

The present invention provides a solution to the desire of balancing toughness with flexibility in a three-dimensional printed part. That solution comes in the form of a curable composition comprising a polybutadiene urethane (meth) acrylate; a maleated isoprene (meth)acrylate; a (meth)acrylate monomer(s); and a photoinitiator.

DETAILED DESCRIPTION

As noted above, the present invention provides a curable composition comprising a polybutadiene urethane (meth) acrylate; a maleated isoprene (meth)acrylate; a (meth)acrylate monomer(s); and a photoinitiator(s).

The polybutadiene urethane (meth)acrylate includes acrylated or (meth)acrylated polyester urethanes and/or acrylated or (meth)acrylated polyether urethanes.

Commercially available examples of such (meth)acrylate-functionalized oligomers, polymers or resins include the polybutadiene urethane (meth)acrylates from Dymax Corporation, Torrington, CT, such as BR-641D, which is reported to have a Tg of −20° C.

The polybutadiene urethane (meth)acrylate may be present in an amount of about 15 to about 50 percent by weight, such as about 25 to about 35 percent by weight, desirably about 30 percent by weight of the composition.

The maleated isoprene (meth)acrylate should comprise at least two (meth)acrylate functional groups. The number of functional groups should be nominally 2 or 3.

The maleated isoprene (meth)acrylate should have a molecular weight (Mw) of at least about 17,000, such as at least about 35,000.

The maleated isoprene (meth)acrylate should have a melt viscosity of at least about 30 Pas at a temperature of 38° C., such as a melt viscosity of at least about 190 Pas at a temperature of 38° C.

The maleated isoprene (meth)acrylate should have a Tg of about −60° C.

The maleated isoprene (meth)acrylate should have a flash point of about 195° C.

The maleated isoprene (meth)acrylate should be 1,3-butadiene-2-methyl-homocopolymer, maleated, 2-[(2-methyl-1-oxo-2-propenyl)oxy]ethyl esters, commercially available examples of which are LIR UV curable isoprenes called UC-102M and UC-203M from Kuraray Co., Ltd., Tokyo, Japan.

The maleated isoprene (meth)acrylate should be present in an amount of about 15 to about 50 percent by weight, such as about 25 to about 35 percent by weight, desirably about 30 percent by weight of the composition.

The polybutadiene urethane (meth)acrylate and the maleated isoprene (meth)acrylate should be present in a by weight ratio of about 1:1.

The (meth)acrylate monomer may be selected from a host of compounds. For instance, tetrahydrofurfural acrylate, hydroxyethylacrylate, hydroxypropyl acrylate, isobornyl acrylate, isobornyl methacrylate, lauryl acrylate, lauryl methacrylate, tetraethyleneglycol dioctanoate, butylene glycol diacrylate, diethylene glycol diacrylate, hexandiol diacrylate, neopentyl glycol diacrylate, triethylene glycol diacrylate, tetraethylene glycol diacrylate, trimethylol propane ethoxylate triacrylate, pentaerythritol tetraacrylate, tripropylene glycol diacrylate, trimethylol propane triacrylate, ditrimethylol propane tetraacrylate, dipentaerythritol pentaacrylate, pentaerythritol triacrylate, ethylhexyl acrylate, butyl acrylate, trideclodacanedimethanol diacrylate, hexane diol diacrylate, dicyclopentanyl acrylate, phenoxyethyl acrylate, 1,9-nonanediol diacrylate and their corresponding (meth)acrylate monomers may be used. Desirably, the (meth)acrylate monomer should be isobornyl acrylate or isobornyl methacrylate.

Commercially available (meth)acrylate monomers also include SR 531 (a cyclic trimethylolpropane formal acrylate) and SR 833s (a difunctional tricyclodecanedimethanol diacrylate), each from Arkema Inc. (Sartomer Americas division), Exton, PA.

The (meth)acrylate monomer may be present in an amount of about 15 to about 75 percent by weight, such as about 25 to about 50 percent by weight, desirably about 35 percent by weight of the composition.

The (meth)acrylate monomer should be present in an amount greater than either of the polybutadiene urethane (meth)acrylate or the maleated isoprene (meth)acrylate.

A photoinitiator may be included in the curable composition. Many photoinitiators may be used, including acetophenone and derivatives thereof, such as dichloroacetophenone, trichloroacetophenone, dialkoxyacetophenone, 2,2-dimethoxy-2-phenylacetophenone and 4-dialkylaminoacetophenone; benzophenone and derivatives thereof, such as 4,4'-bis(dimethylamino)benzophenone (Michler's ketone) and 4,4'-bis(diethylamine)benzophenone; benzil; benzoin and derivatives thereof, such as benzoin alkyl ether; benzildimethylketal; benzoylbenzoate; alphaacyloxime esters; thioxanthone and derivatives thereof, such as 2-chlorothioxanthone and diethylthioxanthone; azo-compounds, such as azobisisobutyronitrile; benzoyl peroxide; camphoquinone; and phosphine oxides, such as diphenyl-2,4,6-trimethylbenzoylphosphine oxide, with and without 1-benzoyl-cyclohexanol. Desirable ones are the phosphine oxides, such as triphenyl phosphine oxide and bisacyl phosphine oxide, and ethyl (2,4,6-trimethylbenzoyl) phenylphosphinate.

The photoinitiator may be present in an amount of about 0.5 to about 10 percent by weight.

The curable compositions may further include a variety of optional components, including, stabilizers, fillers and colorants. Fillers include silicas, such as fumed silica, which may be untreated or surface treated. When treated, the surface treatments include hexamethylenedisilazane or polydimethylsiloxane to increase hydrophobicity. When used, the silica may be present in an amount of about 0.5 to about 10 percent by weight.

The curable composition may be printed using any of a variety of three dimensional printers. The Examples below show the use of a LOCTITE PR-10 printer.

The curable composition may be used in a method of preparing a three-dimensional printed part made by additive manufacturing as follows:
- A. performing additive manufacturing using the inventive curable composition to form a three-dimensional part on a build substrate, said three-dimensional printed part made according to data indicating a pre-determined pattern; and
- B. optionally, removing the so-formed part from the build substrate. Or, as follows:
- A. providing a build surface;
- B. providing the inventive curable composition, a portion of which is deposited on the build surface according to data indicating a pre-determined pattern;
- C. exposing the portion of the curable composition to radiation in the electromagnetic spectrum to form a three-dimensional printed part;
- D. optionally, exposing the three-dimensional printed part of C. to a second energy source; and
- E. optionally, removing the so-formed part from the build substrate.

The curable composition may be cured as printed by exposure to radiation in the electromagnetic spectrum, such as by ultraviolet radiation emitted by a LED source at 405 nm.

If desirable, a post processing exposure to an additional energy source (e.g., exposure to radiation in the electromagnetic radiation at a second wavelength, such as 365 nm and/or to elevated temperature conditions) may be used to achieve a three dimensional printed part with a modified physical property set.

For instance, the curable composition, after exposure to radiation in the electromagnetic spectrum at a first wavelength, exhibits at least one of the following physical properties: percent elongation of greater than about 115, modulus of greater than about 3, tensile strength of greater than about 2 N/m$^2$ and tear strength of greater than about 10 kN/m and after exposure to an elevated temperature condition and/or radiation in the electromagnetic spectrum at a second wavelength, the composition exhibits at least one of the following physical properties: percent elongation of greater than about 115, modulus of greater than about 30, tensile strength of greater than about 6 N/m$^2$ and tear strength of greater than about 28 kN/m.

And the composition exhibits a second modulus after exposure to an elevated temperature condition and/or radiation in the electromagnetic spectrum at a second wavelength that is about 10 times greater than a first modulus after exposure to radiation in the electromagnetic spectrum.

EXAMPLE

In the examples, a Digital Light Processing 3DPrinter with a 400-405 nm projector was used to print parts in the shape of a dog bone (ASTM D638, Type 5) dimensioned 6.35 cm in the X direction×9.55 cm in the Y direction×4 mils in the Z direction. The printing parameters are set forth below in Table A.

TABLE A

| Printing Parameters | | |
|---|---|---|
| 2 Initial Layers | Initial: | Default: |
| Lay Thickness | 0.1 | 0.05 |
| Rehab Time | 25 | 25 |
| Curing Time | 55 | 4.5 |
| Retraction Height | 9 | 9 |
| Retraction Speed Up | 20 | 20 |
| Time at Top | 2 | 2 |
| Retraction Speed Down | 35 | 35 |
| Intensity | 100 | 100 |

A curable composition (Sample No. 1) according to Table B below was used as the resin for printing.

TABLE B

| Component | Sample No. 1/ Amt (wt %) |
|---|---|
| 1,3-Butadiene-2-Methyl-Homopolymer, Maleated, 2-[(2-methyl-1-oxo-2-propenyl)oxy] ethyl esters | 30 |
| Isobornyl Acrylate | 37.575 |
| Polybutadiene urethane acrylate | 30 |
| TPO-L | 2.4 |
| Monarch 280 | 0.025 |
| | 100 |

Five sets of the dog bones were printed and evaluated, results for which are captured below in Table C. The percent elongation, modulus and tear strength were measured at a pull rate of 10 mm/min.

TABLE C

| Physical Property | As Printed | As Printed/Post Processed* |
|---|---|---|
| Elongation | 123% | 118% |
| Modulus | 3.7 | 34.9 |
| Tensile Strength | 2.106 N/m$^2$ | 9.84 N/m$^2$ |
| Tear Strength | 11.71 kN/m | 28.48 kN/m |

*365 nm Loctite UVAloc1000, 300 s each side of 3D printed part at 90 mW/cm$^2$

It was surprising to observe that despite an increase in toughness (as measured by an increase in modulus) the flexibility remained substantially the same (as measured by percent elongation).

What is claimed is:

1. A three dimensionally printable curable composition comprising:
    a polybutadiene urethane (meth)acrylate in an amount of about 25 to about 35 percent by weight;
    a maleated isoprene (meth)acrylate in an amount of about 25 to about 35 percent by weight;
    a (meth)acrylate monomer wherein the (meth)acrylate monomer is present in an amount greater than either of the polybutadiene urethane (meth)acrylate or the maleated isoprene (meth)acrylate; and
    a photoinitiator, wherein the percent by weight is based on the total composition, and wherein when three dimensionally printed cured products of the composition exhibit at least one of the following physical properties:

percent elongation of greater than about 115, modulus of greater than about 3, tensile strength of greater than about 2 and tear strength of greater than about 10 kN/m and after exposure to an elevated temperature condition and/or radiation in the electromagnetic spectrum at a second wavelength, the composition exhibits at least one of the following physical properties: percent elongation of greater than about 115, modulus of greater than about 30, tensile strength of greater than about 9 Mpa·s and tear strength of greater than about 28 KN/m.

2. The composition of claim 1, wherein the maleated isoprene (meth)acrylate comprises at least two (meth)acrylate functional groups.

3. The composition of claim 1, wherein the maleated isoprene (meth)acrylate has a molecular weight of at least about 17,000.

4. The composition of claim 1, wherein the maleated isoprene (meth)acrylate has a molecular weight of about 35,000.

5. The composition of claim 1 wherein the maleated isoprene (meth)acrylate has a melt viscosity of at least about 30 Pas at a temperature of 38° C.

6. The composition of claim 1, wherein the maleated isoprene (meth)acrylate has a melt viscosity of at least about 190 Pas at a temperature of 38° C.

7. The composition of claim 1, wherein the maleated isoprene (meth)acrylate has a Tg of about −60° C.

8. The composition of claim 1, wherein the maleated isoprene (meth)acrylate has a flash point of about 195° C.

9. The composition of claim 1, wherein the maleated isoprene (meth)acrylate comprises 1,3-butadiene-2-methyl-homocopolymer, maleated, 2-[(2-methyl-1-oxo-2-propenyl)oxy]ethyl esters.

10. The composition of claim 1, wherein the maleated isoprene (meth)acrylate and the polybutadiene urethane (meth)acrylate are present in a by weight ratio of about 1:1.

11. The composition of claim 1, wherein the (meth)acrylate monomer is selected from one or more of tetrahydrofurfural acrylate, hydroxyethylacrylate, hydroxypropyl acrylate, isobornyl acrylate, isobornyl methacyrlate, lauryl acrylate, lauryl methacrylate, tetraethyleneglycol dioctanoate, butylene glycol diacrylate, diethylene glycol diacrylate, hexandiol diacrylate, neopentyl glycol diacrylate, triethylene glycol diacrylate, tetraethylene glycol diacrylate, trimethylol propane ethoxylate triacrylate, pentaerythritol tetraacrylate, tripropylene glycol diacrylate, trimethylol propane triacrylate, ditrimethylol propane tetraacrylate, dipentaerythritol pentaacrylate, pentaerythritol triacrylate, cyclic trimethylolpropane formal acrylate, difunctional tricyclodecanedimethanol diacrylate, 2-phenoxyethyl acrylate and their corresponding (meth)acrylate monomers.

12. The composition of claim 1, wherein the (meth)acrylate monomer is isobornyl acrylate or isobornyl methacrylate.

13. The composition of claim 1, wherein the (meth)acrylate monomer is present in an amount greater than about 25 to about 75 percent by weight, based on the total weight of the composition.

14. The composition of claim 1, wherein the polybutadiene urethane (meth)acrylate has a Tg of about −20° C.

15. The composition of claim 1, wherein after exposure to radiation in the electromagnetic spectrum at a first wavelength, the composition exhibits at least one of the following physical properties: percent elongation of greater than about 115, modulus of greater than about 3, tensile strength of greater than about 5 and tear strength of greater than about 10 KN/m and after exposure to an elevated temperature condition and/or radiation in the electromagnetic spectrum at a second wavelength, the composition exhibits at least one of the following physical properties: percent elongation of greater than about 115, modulus of greater than about 30, tensile strength of greater than about 6 Mpa·s and tear strength of greater than about 28 KN/m.

16. The composition of claim 1, wherein the composition exhibits a second modulus after exposure to an elevated temperature condition and/or radiation in the electromagnetic spectrum at a second wavelength that is about 10 times greater than a first modulus after exposure to radiation in the electromagnetic spectrum.

17. A method of preparing a three-dimensional printed part made by additive manufacturing, comprising the steps of:
A) performing additive manufacturing using a curable composition of claim 1 to form a three-dimensional part on a build substrate, said three-dimensional printed part made according to data indicating a pre-determined pattern; and
B) optionally, removing the three-dimensional printed part of formed in step A from the build substrate.

18. A method of preparing a three-dimensional printed part made by additive manufacturing, comprising the steps of:
A) providing a build surface;
B) providing a curable composition of claim 1, a portion of which is deposited on the build surface according to data indicating a pre-determined pattern;
C) exposing the portion of the curable composition to radiation in the electromagnetic spectrum to form a three-dimensional printed part;
D) optionally, exposing the three-dimensional printed part formed in step C to a second energy source; and
E) optionally, removing the so-formed part from the build substrate.

* * * * *